(12) United States Patent
Huang et al.

(10) Patent No.: US 8,454,732 B2
(45) Date of Patent: Jun. 4, 2013

(54) COMPOSITION AND PROCESS FOR MANUFACTURE OF A HIGH TEMPERATURE CARBON-DIOXIDE SEPARATION MEMBRANE

(75) Inventors: Francis Yu Chang Huang, San Antonio, TX (US); Vladimir I. Gorokhovsky, San Antonio, TX (US); Kent E. Coulter, Fair Oaks Ranch, TX (US)

(73) Assignee: Southwest Research Institute, San Antonio, TX (US)

( * ) Notice: Subject to any disclaimer, the term of this patent is extended or adjusted under 35 U.S.C. 154(b) by 150 days.

(21) Appl. No.: 13/230,484

(22) Filed: Sep. 12, 2011

(65) Prior Publication Data
US 2013/0064724 A1    Mar. 14, 2013

(51) Int. Cl.
*B01D 53/22*    (2006.01)
(52) U.S. Cl.
USPC ............ 96/11; 95/43; 95/45; 95/51; 96/4; 96/7
(58) Field of Classification Search
USPC .................... 95/43, 45, 51; 96/4, 7, 11
See application file for complete search history.

(56) References Cited

U.S. PATENT DOCUMENTS

| | | | |
|---|---|---|---|
| 6,024,774 A * | 2/2000 | Nakagawa et al. | 48/198.3 |
| 7,572,318 B2 * | 8/2009 | Jadhav et al. | 95/45 |
| 7,708,806 B2 * | 5/2010 | Wright et al. | 95/139 |
| 7,744,845 B2 | 6/2010 | Stephenson | |
| 7,909,911 B2 * | 3/2011 | Lackner et al. | 95/51 |
| 7,938,893 B2 * | 5/2011 | Doong et al. | 96/7 |
| 8,083,836 B2 * | 12/2011 | Wright et al. | 95/139 |
| 8,088,197 B2 * | 1/2012 | Wright et al. | 95/51 |
| 8,163,065 B2 * | 4/2012 | Lackner et al. | 95/51 |
| 8,337,589 B2 * | 12/2012 | Wright et al. | 95/51 |
| 2009/0101008 A1 * | 4/2009 | Lackner et al. | 95/51 |
| 2011/0268636 A1 * | 11/2011 | Lackner et al. | 423/230 |

OTHER PUBLICATIONS

Ida, et al., "Mechanism of High-Temperature CO2 Sorption on Lithium Zirconate," Environ. Sci. Technol., 2003, 37 (9), pp. 1999-2004.

Nair, et al., "Lithium based ceramic materials and membranes for high temperature CO2 separation" Progress in Materials Science 54 (2009) 511-541.

* cited by examiner

*Primary Examiner* — Jason M Greene
*Assistant Examiner* — Anthony Shumate
(74) *Attorney, Agent, or Firm* — Grossman, Tucker et al (57) ABSTRACT

A membrane composition and process for its formation are disclosed from the removal of carbon dioxide ($CO_2$) from mixed gases, such as flue gases of energy production facilities. The membrane includes a substrate layer comprising inorganic oxides, a barrier layer of in-situ formed $Li_2ZrO_3$, a $Li_2ZrO_3$ sorbent layer and an inorganic oxide cap layer. The membrane has a feed side for introduction of mixed gases containing nitrogen ($N_2$) and a sweep side for recovery of $CO_2$ wherein the membrane has a relatively high selectivity for $CO_2$ transport at temperatures in the range of 400° to 700° C.

17 Claims, 11 Drawing Sheets

COMPOSITION AND PROCESS FOR MANUFACTURE OF A HIGH TEMPERATURE CARBON-DIOXIDE SEPARATION MEMBRANE

FIELD OF THE INVENTION

The present invention relates to a membrane composition and process for its formation which may then be employed for removal of carbon-dioxide ($CO_2$) such as the removal of $CO_2$ from flue gases of energy production facilities. The removal and capture of $CO_2$ may be accomplished at relatively high temperature and without the need for cooling flue gas thereby increasing the efficiency of carbon capture and sequestration.

BACKGROUND

Reduction in carbon dioxide ($CO_2$) emission from the coal-fired power plants has become a focal point of international efforts for climate control in recent years. Carbon dioxide emission from coal-fired power plants constitutes a relatively large portion (~40%) of total $CO_2$ emissions. Developing a means to control coal-derived $CO_2$ emission is imperative in this effort; however, the cost for such carbon capture and sequestration (CCS) can be up to 50% of the energy production cost of a coal-fired power plant. A major portion of the penalty for CCS is the energy loss in cooling the flue gas (typically up to 750° C. exiting from the burner) to a lower temperature (100-300° C.), which the $CO_2$ separation system can tolerate. One reported method of reducing the energy penalty for CCS is to separate $CO_2$ at the existing flue gas temperature.

Relatively early studies of $CO_2$ capture with membranes indicated that the cost was 30% higher than the cost of the traditional amine chemical absorption process. The limitations of the studied membrane processes was identified as coming from the high cost of compressing low pressure flue gas and the low purity of the permeate, which resulted in the need for multistage processing to achieve the most economic arrangement for CCS in such systems. Recent analyses show that considerable $CO_2$ removal rates can be achieved with gas membrane separation systems, and the economic competitiveness of such systems in comparison with amine-based systems depends on the characteristics of both of membrane and feed gas. When membrane selectivity and permeability are improved, the $CO_2$ capture and total CCS costs may be reduced by up to 15% compared to the amine process.

$CO_2$ separation using membranes is a topic of great commercial interest with most of the reported membranes operating at relatively low temperatures. From the viewpoints of mechanism of separation and material stability, a growing need exists for membrane materials that are useful at temperatures of 400° C. or above.

SUMMARY

The present disclosure relate to a method of forming a membrane for separation of carbon dioxide ($CO_2$) from a mixture of gases comprising supplying a substrate layer of inorganic oxides with average pore sizes of 3.0 μm to 10.0 μm which is 20-80% porous with a thickness of 6.0 mm to 15 mm. One may then deposit on the substrate layer precursors for the formation of $Li_2ZrO_3$ and react the precursors and form a $Li_2ZrO_3$ barrier layer wherein the barrier layer is formed at a thickness of 10 μm to 100 μm with a porosity of 0% to 30%. One may then deposit on the barrier layer a sorbent layer comprising $Li_2ZrO_3$ at a thickness of 100 μm to 500 μm followed by deposition of a cap layer on the sorbent layer comprising inorganic oxides wherein the cap layer has a thickness of 50 μm to 250 μm. One may then expose such membrane to carbon dioxide at elevated temperatures (400° C. to 700° C.) and separate carbon dioxide from the gas mixture without the need for gas mixture cooling.

The present disclosure also relates to a membrane for separation of carbon dioxide ($CO_2$) from a mixture of gases comprising a substrate layer comprising inorganic oxides with average pore sizes of 3.0 μm to 10.0 μm which is 20-80% porous with a thickness of 6.0 mm to 15 mm; a barrier layer of in-situ $Li_2ZrO_3$ at a thickness of 10 μm to 100 μm with a porosity of 0% to 30%; a $Li_2ZrO_3$ sorbent layer at a thickness of 100 μm to 500 μm; and an inorganic oxide cap layer at a thickness of 50 μm to 250 μm. The membrane is configures such that it defines a feed side for introduction of mixed gases containing nitrogen ($N_2$) and a sweep side for recovery of $CO_2$ and the membrane has a selectivity a according to the following:

$$\alpha = (Y_A/Y_B)/((P_h X_A - P_1 Y_A)/(P_h X_B - P_1 Y_B))$$

where $Y_A$=mole % $CO_2$ in the sweep side, $X_A$=mole % $CO_2$ in the feed side, $P_h$=backpressure in the feed side, $X_B$=mole % $N_2$ in the feed side; $Y_B$=mole % $N_2$ in the sweep side, and $P_1$=backpressure in the sweep side; and wherein the value of α at 500° C. is in the range of 2.0 to 20.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

The present invention provides a membrane to separate $CO_2$ from, e.g., the flue gas of coal-fired power plants and similar hot sources, such as hydrogen production plants using a hydrocarbon steam reforming process, or any industrial processes that produce relatively large quantities of $CO_2$ at relatively high temperatures. The membranes herein are therefore configured to separate $CO_2$ from a given environment at temperatures at or above 400° C., and in the preferred range of 400° C. to 700° C.

Figure 1:
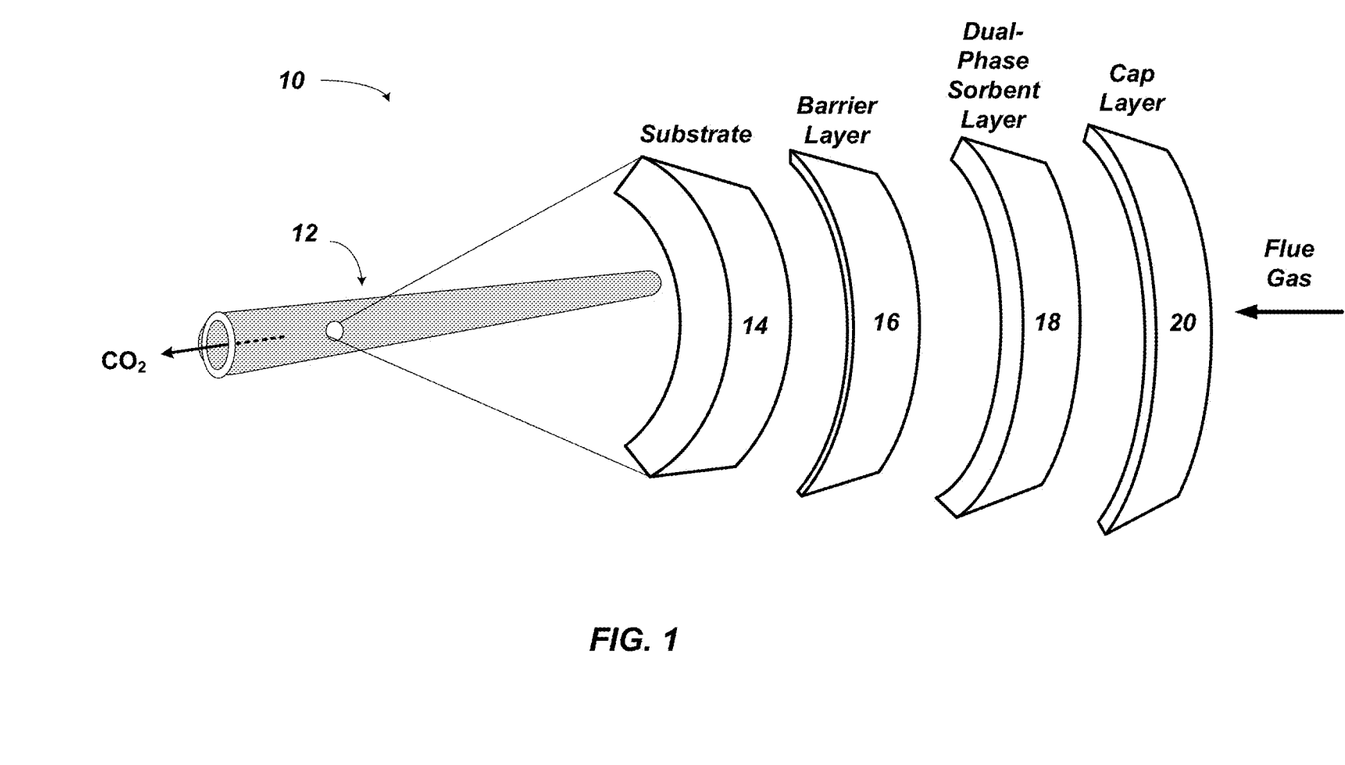
FIG. 1 is a cross-sectional view of the $CO_2$ separation membrane.

Attention is directed to FIG. 1 which illustrates a preferred configuration for the $CO_2$ separation membrane. As can be seen, the membrane 10 may preferably be in tubular form 12 and may include an internal sweep within the tube to assist in $CO_2$ transport. The membrane is preferably sourced from inorganic oxide base substrate materials, such as $ZrO_2$, $Al_2O_3$, and lithium zirconate ($Li_2ZrO_3$) may then be applied as a solid absorbent to the substrate layer, as discussed further herein. Accordingly, the membrane preferably includes a substrate layer 14 of inorganic oxides which preferably has pores (openings) at an average pore size of 3.0 μm to 10.0 μm (linear dimension of the openings) and the substrate layer itself is preferably 20-80% porous. The substrate layer 14 may preferably have a thickness of 6.0 mm to 15 mm, and all values therein, in 0.1 mm increments. A more preferably thickness is in the range of 6.0 mm to 8.0 mm. This therefore provides what may be understood as a porous support layer containing lithium zirconate sorbent material.

A relatively thin and dense $Li_2ZrO_3$ barrier layer 16 is provided herein by in-situ procedures and presents a restriction to prevent any other gases except $CO_2$, if entered into a dual-phase sorbent layer 18 (described below) from transporting through the substrate by its relatively lower porosity than that of the dual phase sorbent layer as well as the optional use of selective eutectic carbonates layers on the $Li_2ZrO_3$. Barrier Layer 16 may therefore preferably have a thickness of 10 μm to 100 μm and a porosity form 0 to 30%

At relatively high temperature in the $CO_2$ environment, e.g. at temperature in the range of 400° C.-700° C. porous $Li_2ZrO_3$ sorbent may form a dual-phase layer 18 comprising a solid $ZrO_2$ framework and molten lithium carbonate ($Li_2CO_3$). Such dual-phase system may then only allow $CO_2$ to diffuse through and thus be transported while leaving the majority of any other gases behind. That is, 90% or more of gases other than $CO_2$ will not transport through the membrane 10, more preferably 95% or more, and in a most preferred configuration, 99% or more of the gases other than $CO_2$ will not transport through the membrane.

A porous ceramic $ZrO_2$ or $Al_2O_3$ cap layer 20 may be deposited on the dual phase sorbent layer 18 and used to improve the mechanical strength of the entire membrane system as well as serving as a protective coating to prevent other flue gas contaminants from entering into the membrane. Cap layer 20 may preferably have a thickness of 50 μm to 250 μm.

Figure 2:
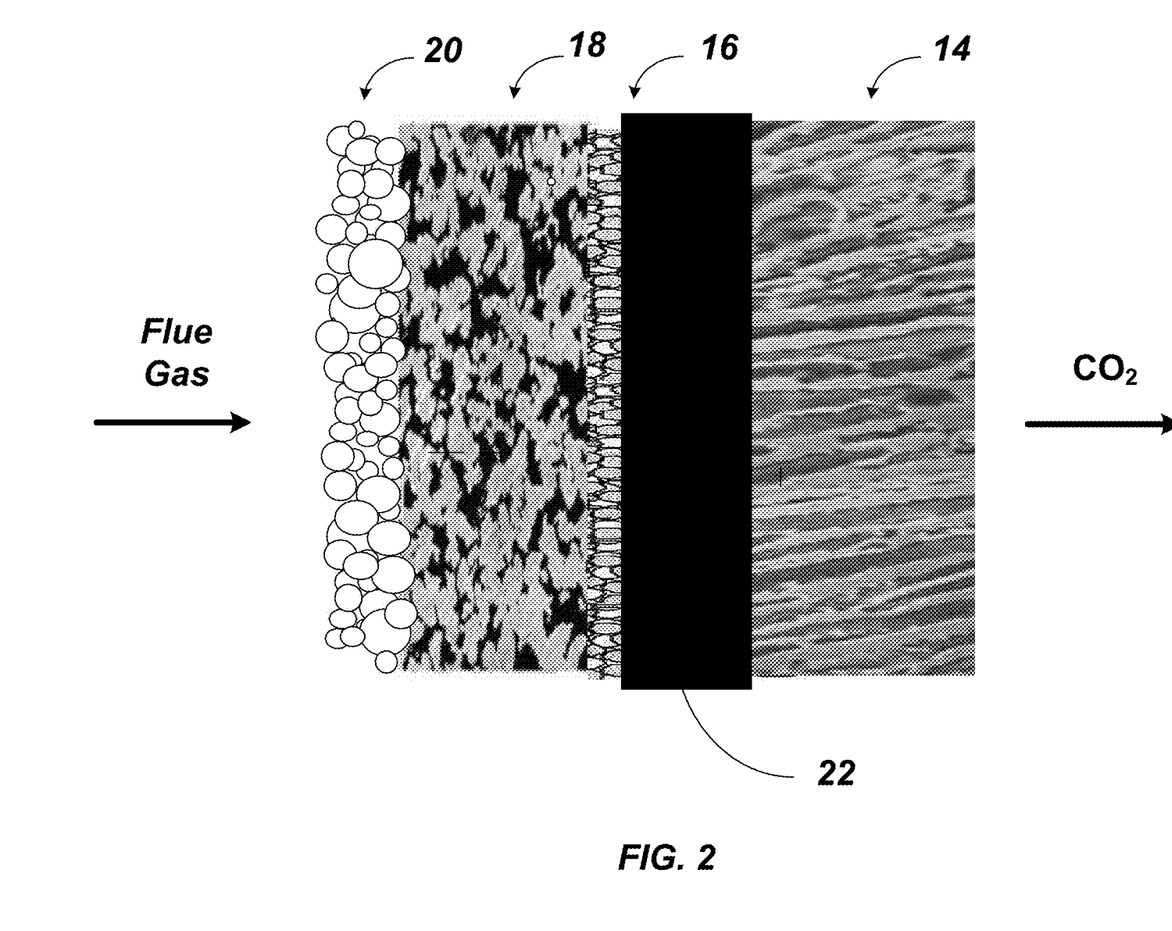
FIG. 2 is a composite microscopic view of the $CO_2$ separation membrane.

FIG. 2 provides a composite microscopic view of the membrane 10 herein. Layer 14 comprises the porous $ZrO_2$ and at 22 can be seen the region now infiltrated with liquid $Li_2CO_3$. The relatively dense $Li_2ZrO_2$ layer formed in-situ is again shown at 16 and the dual-phase sorbent layer is again identified at 18 along with porous cap layer 20.

It may now be noted that the $CO_2$ absorption and transport through the membrane is based in part on the reversible reaction of $Li_2ZrO_3$ and $CO_2$ as shown in the following:

$$Li_2ZrO_{3(s)} + CO_{2(g)} \leftrightarrow Li_2CO_{3(l)} + ZrO_{2(s)} \qquad [Eq. 1]$$

Furthermore, at high temperatures, such as temperatures in the range of 400-700° C., and under a certain $CO_2$ concentration in the flue gas, a steady-state reaction will be established and the $CO_2$ will be transported through the membrane containing $Li_2ZrO_3$, while other gases, such as $N_2$, being rejected.

In-Situ Formation of $Li_2ZrO_3$ Barrier Layer

As noted above, the substrate layer 14 may comprise an inorganic oxide such as porous zirconia oxide or porous alumina oxide. The preferred embodiment herein utilizes an in-situ formed $Li_2ZrO_3$ based barrier layer 16. The role of this layer is to serve as a final barrier against the penetration of gases other than $CO_2$ through the membrane. Layer 16 may control the rate of $CO_2$ transport as well as the efficiency of the $CO_2$ selectivity of the assembled membrane. It may preferably be formed within the porous ceramic substrate layer 14, with or without pore size reduction, via in-situ procedures, using chemical vapor deposition (CVD), physical vapor deposition (PVD), pressurized chemical infiltration, and similar processes.

CVD processes utilize appropriate precursor compounds for deposition of $Li_2ZrO_3$ coating via decomposition and activation of the precursor in an oxygen containing gaseous atmosphere. Reference to precursor compounds for $Li_2ZrO_3$ herein may be understood as one or more compounds which may react when deposited within the substrate 14 and form $Li_2ZrO_3$. In the CVD process the substrate temperature is established in the range of thermodynamically stable formation of $Li_2ZrO_3$ via a heterogeneous reaction between the reactive gas atmosphere and the substrate to be coated. Plasma assisted CVD processes using inductively coupled thermal plasma (ICTP) or electron cyclotron resonance (ECR) plasma heating can be utilized for further activation of the reactive vapor plasma environment, which allows reducing the deposition temperature and improving the coating density and morphology by reduction of the coating grains and producing ultra-fine coating morphology using deposition under relatively intense ion bombardment. In addition, plasma activation of the CVD process via ionization and excitation of atoms, molecules and radicals by collisions with excited particles and electrons allows depositing near stoichiometric coatings on substrates having temperatures below the temperature determined by thermodynamically equilibrated conditions of the coating material. This results in substantial reduction of coating stress due to thermal expansion mismatch between coating and substrate materials.

Turning to the pressed infiltration method, also referred to as press wet deposition, the precursors of $Li_2ZrO_3$, lithium nitrate ($LiNO_3$) and zirconia nitrate ($ZrO(NO_3)_2$), in stoichiometric ratios, are mixed in a solvent. A porous soft medium is saturated with the mixture and is placed on a substrate. The $Li_2ZrO_3$ precursors are then forced to infiltrate into the substrate by a rubber roller following by calcination at high temperatures, such as temperatures of 700° C. to 900° C., to again form in-situ $Li_2ZrO_3$ in the substrate.

Preferably, in order to obtain a relatively higher $CO_2$ absorption efficiency, $Li_2ZrO_3$ herein may also be modified to form a potassium doped sorbent in the formula of $K_xLi_{2-x}ZrO_3$, with an optimal crystalline structure. Reference to an optimum crystal structure may be best defined in terms of $CO_2$ absorption efficiency, and therefore, the crystal structure is configured such that the absorption by weight of the $K_xLi_{2-x}ZrO_3$ is such that is absorbs at or above 25% by weight $CO_2$, up to about theoretical absorption of 27.8% by weight. It should also be noted that the value of "x" in the indicated formula is in the range of 0.2-1.0.

The K-doped $Li_2ZrO_3$ yields eutectic carbonate mixtures of $Li_2CO_3$ and $K_2CO_3$ which will be in a molten stage at high temperature (to facilitate the diffusion of $CO_2$ for faster rate of $CO_2$ transport reaction). The optimal $CO_2$ absorption of the tetragonal crystalline phase is achieved by a calcination process.

The in-situ chemical synthesis of $Li_2ZrO_3$ according to the pressed infiltration method can be shown in the equation below. It should be noted that in the equation below, the addition of KNO$_3$ will readily provide the potassium doped sorbent noted herein.

$$2LiNO_3 + ZrO(NO_3)_2 \rightarrow Li_2ZrO_3 + 2N_2O_5 \quad \text{[Eq. 2]}$$

Figure 3:
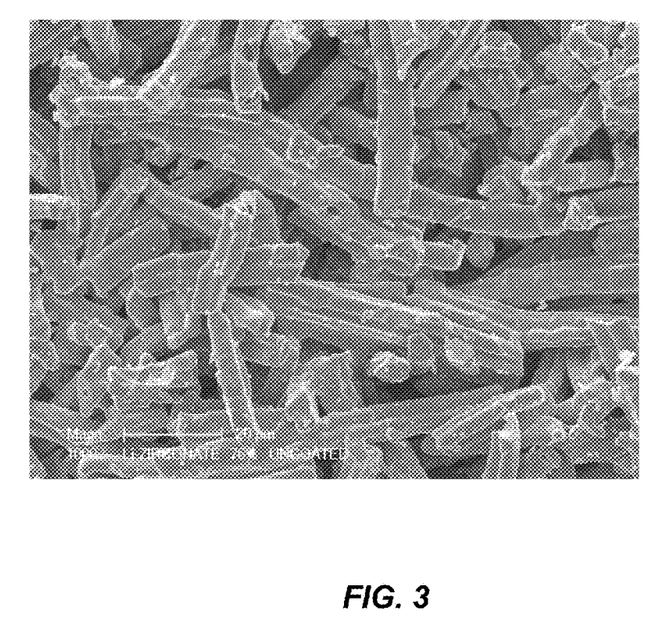
FIG. 3 is a SEM image of an uncoated substrate.
Figure 4:
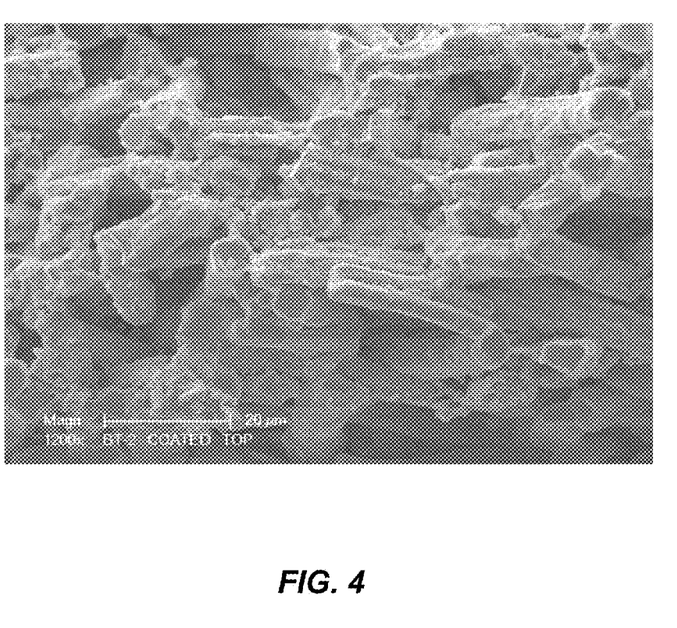
FIG. 4 is a SEM image of $Li_2ZrO_3$ deposited on the surface of the pores of the substrate.

The Li$_2$ZrO$_3$ formed by the press infiltration method, according to the in-situ approach becomes physically attached to the inner pores of the substrates to provide for the boost in CO$_2$ separation disclosed herein. FIG. 3 shows the SEM of the uncoated substrate. FIG. 4 shows the SEM of the Li$_2$ZrO$_3$ crystals deposited on the surface of the pores in the substrate 14 by the press infiltration method. The kinetics of CO$_2$ absorption of the resulting Li$_2$ZrO$_3$ is comparable to Li$_2$ZrO$_3$ prepared by traditional solid state methods. See FIG. 5. In order for the membrane to possess the property of relatively high selectivity of CO$_2$ a relatively close encounter of CO$_2$ and Li$_2$ZrO$_3$ is preferably obtained for the chemical reaction to take place as shown above in Equation 1. The selectivity characteristics are discussed further below.

Figure 6:
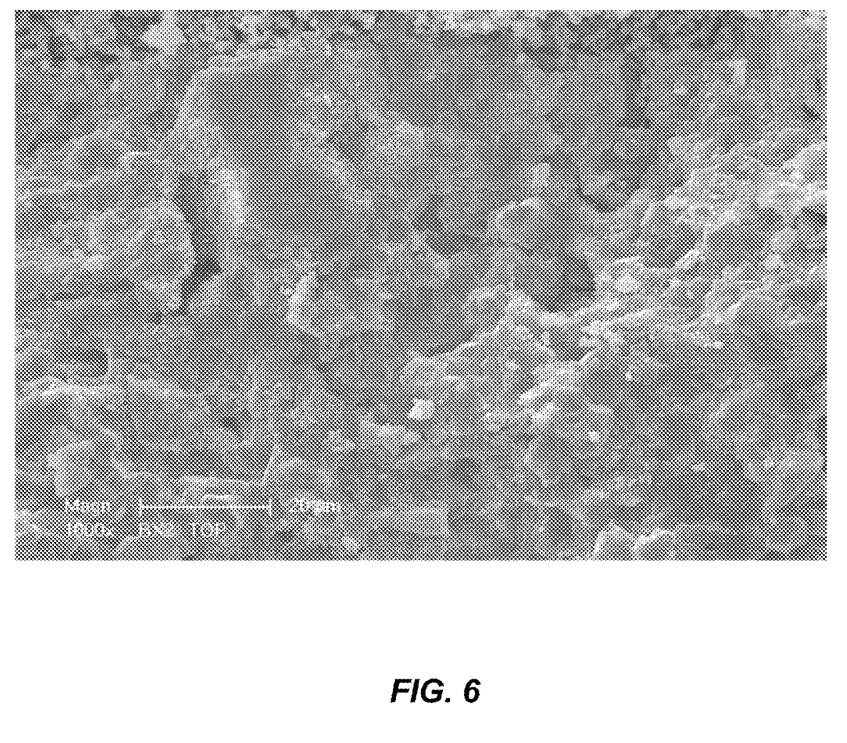
FIG. 6 is a SEM image illustrating a dense layer with pore size reduction and $Li_2ZrO_3$ filling of the pores.

That is, preferably, to minimize the transport of gases other than CO$_2$, channels, open pores or voids in dense barrier layer 16 (see FIGS. 1 and 2) may be minimized to restrict the non-reactive flow of flue gas, which may be understood as a physical flux. Therefore, prior to the process of dense layer deposition, pore size reduction of the upper section of the substrate 14 may preferably be performed to assist in the maximum pore filling of Li$_2$ZrO$_3$ precursors to assist in the achievement of relatively low physical flux. Reference to upper section of the substrate is reference to the feature that for a given thickness of the substrate 14, the top ⅓ of such thickness including the surface layer may be understood as the upper section. Commercially available nanometer particle suspension solutions, such as ZrO$_2$ sol and organosilicate sols may therefore be applied to the substrate, by repeating dipping, drying, and sintering process. Reference to organosilicate may be understood as silica wherein a portion of the Si—O bonds have been replaced by organic groups. FIG. 6 presents a SEM image depicting a completed dense layer with no visible channels on the same substrate as shown in FIG. 3. That is, the upper section is such that it predominantly (50% or more) of the pores that may be present are less than or equal to 5.0 µm, more preferably, less than or equal to 1.0 µm. This process may therefore increase CO$_2$ contact with the Li$_2$ZrO$_3$ according to Equation 1 above.

Furthermore, a layer of eutectic mixture of Li$_2$CO$_3$:K$_2$CO$_3$ (80:20 mole ratio) may be preferably applied on the surface of the substrate 14 before application of layer 18 (see below). This layer may have a thickness of less than or equal to 10.0 µm, or in the range of 0.1-10.0 µm. It is also worth noting that such carbonates may preferably be prepared in an organic solvent as a suspension and applied on the substrate by repeating dipping sintering at the melting point to seal all the minor cracks and pinholes that might be formed during the process of providing dense barrier layer 16. Gas tightness may be evaluated before the presence of layer 18. A substrate layer 14 so treated with the referenced eutectic mixture may preferably have a gas flow through rate of close to 0%, +/−1.0% of that in the feed, and within the range of measurement sensitivity.

Layer 18 generally serves as the initial layer to retain CO$_2$ from the flue gas and minimize the entry of other gases. Layer 18 may preferably have a thickness of 100 µm to 500 µm. The CO$_2$ absorbed in layer 18 may build a high partial pressure as the driving force for CO$_2$ to travel through the membrane. Two deposition methods for producing layer 18 on barrier layer 16 may be employed, include dip coating and chemical spray deposition, as more fully described below. This also may provide for control of the particle sizes and thickness of the deposited Li$_2$ZrO$_3$.

Dip Coating

Synthesis of Li$_2$ZrO$_3$ sorbent with controlled particle size is preferred for layer 18 within the high temperature CO$_2$ separation membrane herein. A solid state method of preparing K-doped Li$_2$ZrO$_3$ with the optimal CO$_2$ absorption kinetics is preferably employed. It may be a mixture of reagent grade K$_2$CO$_3$, Li$_2$CO$_3$ and ZrO$_2$ solids of small particle sizes, in proper molar ratios, or a mixture of water solutions of K$_2$NO$_3$, LiNO$_3$ and zirconyl nitrate [ZrO(NO$_3$)$_2$.xH$_2$O], in proper molar ratios, and calcined at 700-800° C. to yield Li$_2$ZrO$_3$ sorbent in the favorable tetragonal phase. The particle size of the resulting solid sorbent may be further reduced to <1.0 µm by wet milling. Organic binder, such as polyvinyl alcohol (PVA) may be used to mix with the solid sorbent in water as a dip coating mixture. Dense layer coated substrate is manually dipped into the mixture for a specified time, typically 1 second, and dried at 80° C. The dipping and drying process is repeated 5-7 times before the product is then sintered. The particle size of Li$_2$ZrO$_3$ will be controlled by the particle size of starting ZrO$_2$, since during the calcination only ZrO$_2$ particles remain in a solid state due to its high melting point (2700° C.), while Li$_2$CO$_3$ forms a eutectic molten carbonate. The low calcination temperature applied, 700-800° C., favors the formation of the tetragonal phase for the optimal CO$_2$ absorption kinetics.

Chemical Spray Deposition

Figure 5:
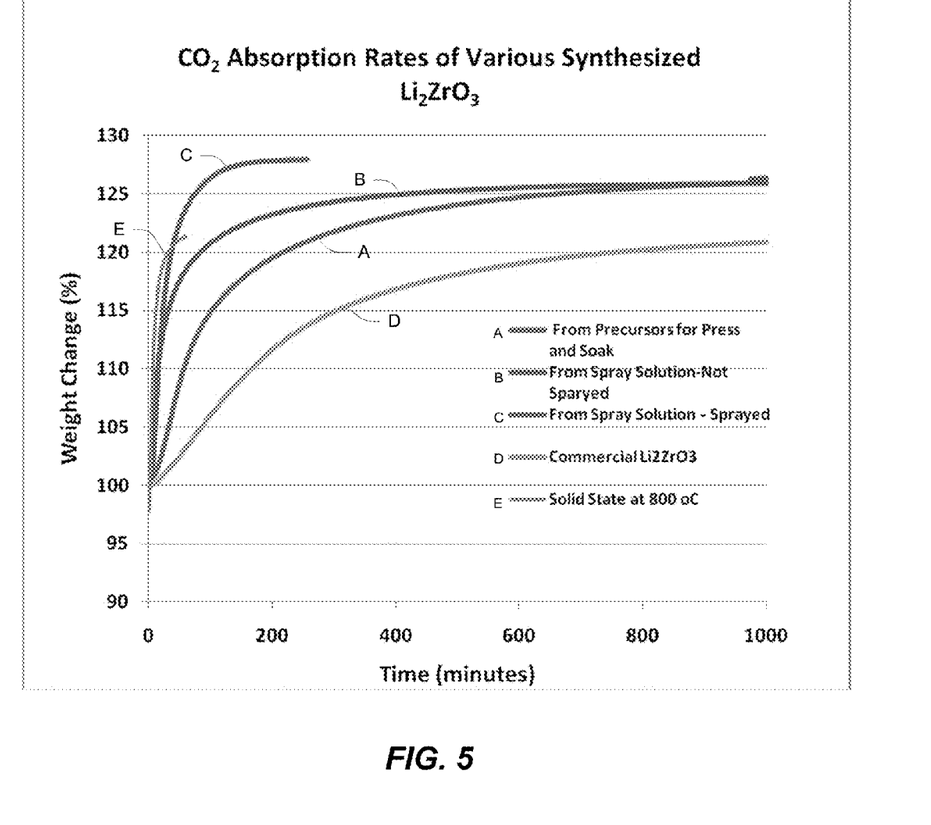
FIG. 5 is a Thermogravimetric Analysis (TGA) showing $CO_2$ absorption kinetics of $Li_2ZrO_3$.

The precursors of Li$_2$ZrO$_3$, LiNO$_3$, KNO$_3$, and ZrO(NO$_3$)$_2$, in proper molar ratio, are dissolved in organic solvent and sprayed in fine droplets through an atomizing nozzle, with a stream of warm air, to deposit on the surface of the dense layer 16 deposited substrate at the boiling point of the solvents, approximately 60° C. After repeated spraying to reach the desired thickness, the spray-deposited ceramic substrates are then calcined in air. The calcination condition is the same as that for the dip coating process. The Li$_2$ZrO$_3$ sorbents formed in the spray coating has CO$_2$ absorption kinetics that are again comparable to that by solid state as shown in FIG. 5. The chemical spray deposition technique combines the formation and deposition of Li$_2$ZrO$_3$ in one step instead of two as in the dip coating method.

Outer Layer Deposition

Figure 7:
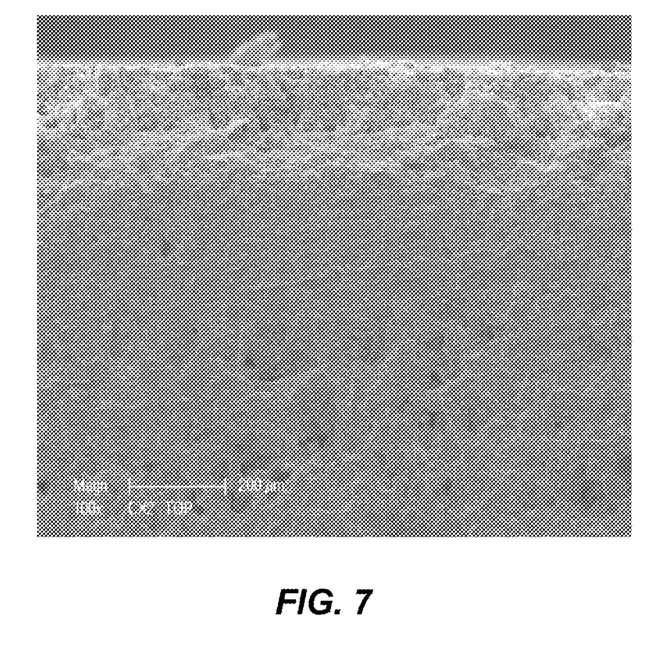
FIG. 7 is a SEM image for dip coating formation of the dual phase sorbent layer 18 (FIG. 1) in a completed membrane.
Figure 8:
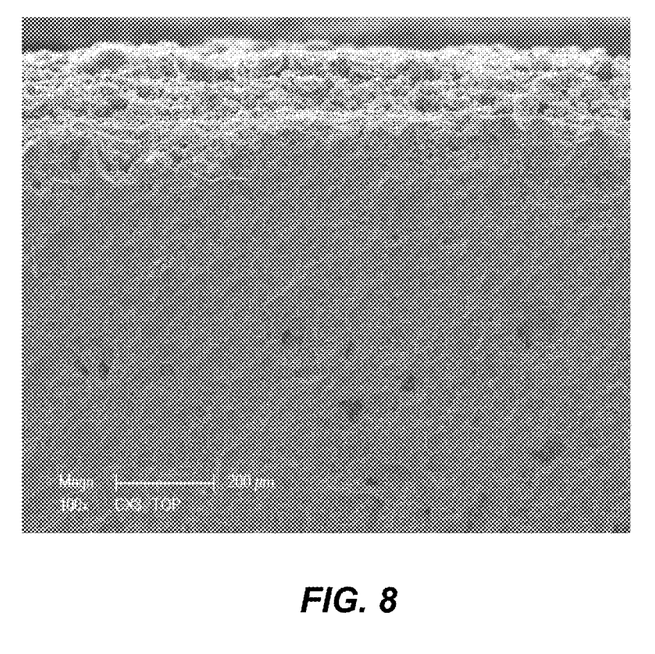
FIG. 8 is a SEM image for chemical spay deposition of the dual phase sorbent layer 18 (FIG. 1) in a completed membrane.

The porous cap outer layer coating 20 can be optionally deposited on top of Li$_2$ZrO$_3$ sorbent layer 18 to further improve the structural integrity of the membrane at high temperature reactive interaction with CO$_2$. This coating having porosity ranging from 10 to 90% will consist of nonreactive ceramics such as alumina (Al$_2$O$_3$) or zirconia-based materials ZrO$_2$ or yttria-stabilized zirconia (YSZ). This layer preferably has a thickness ranging from 50 µm to 250 µm and may be deposited by high temperature high velocity powder plasma spray, HVOF, thermal spray, detonation (D-gun), CVD, or alternatively, by sol-gel, wet spray and other suitable powder application techniques followed by sintering in a suitable gas atmosphere at appropriate temperature and pressure. The SEM images of the cross section of a typical completely assembled membrane is shown in FIGS. 7 and 8 for dip coating and chemical spray deposition, respectively.

Membrane Performance

Figure 9:
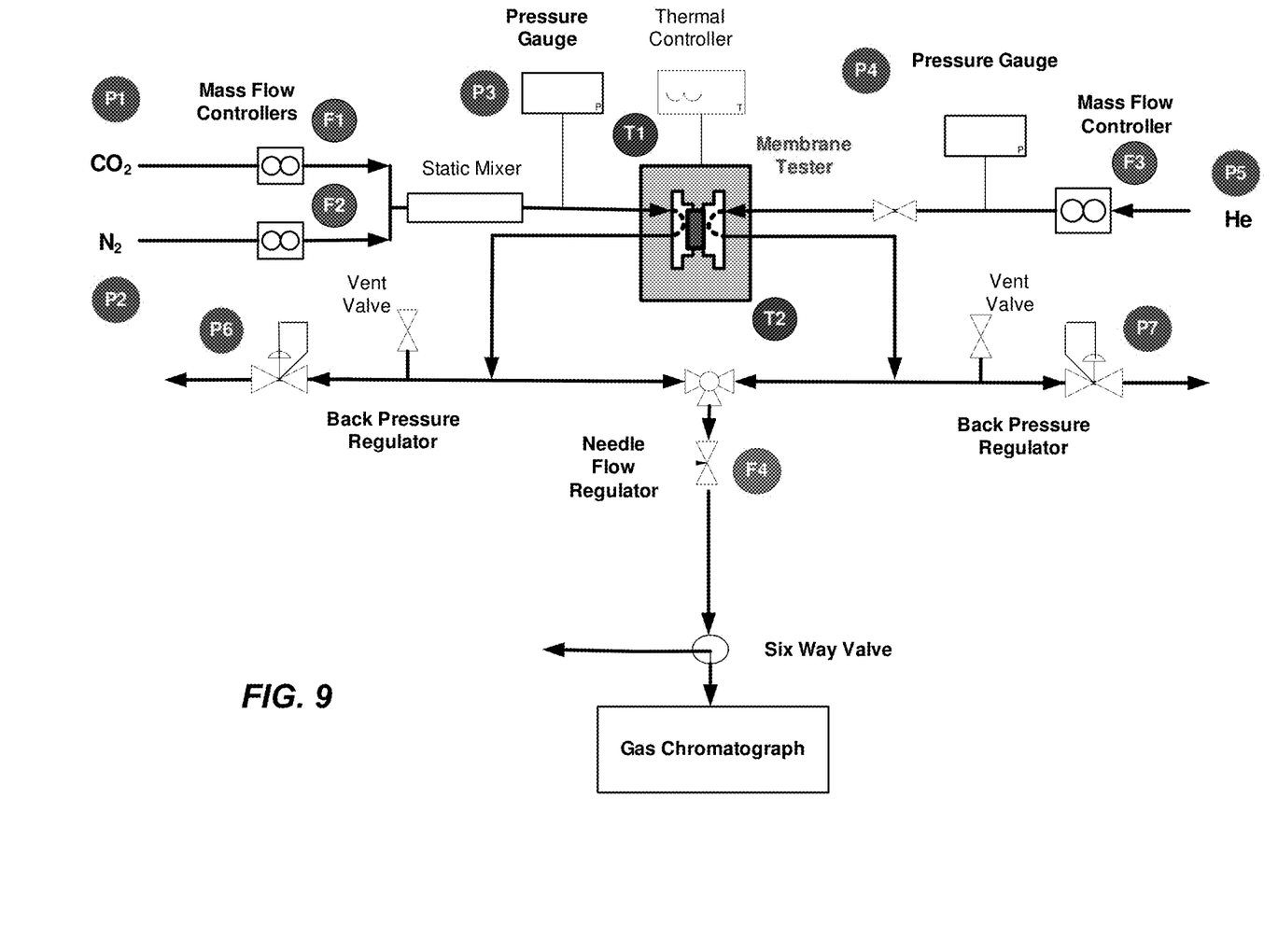
FIG. 9 is a schematic of the test system to evaluate membrane performance.
Figure 10:
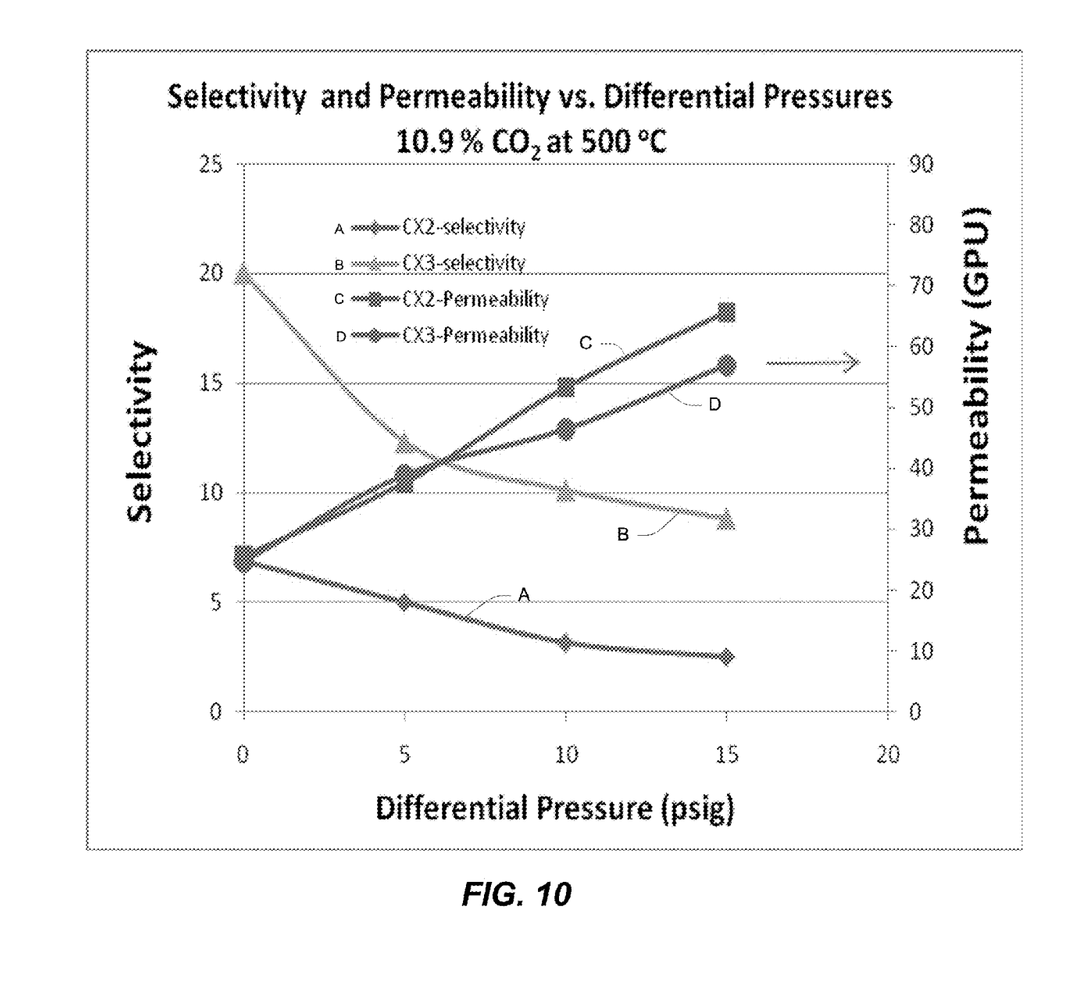
FIGS. 10-11 are plots of the selectivity versus differential pressure for the indicated membranes.
Figure 11:
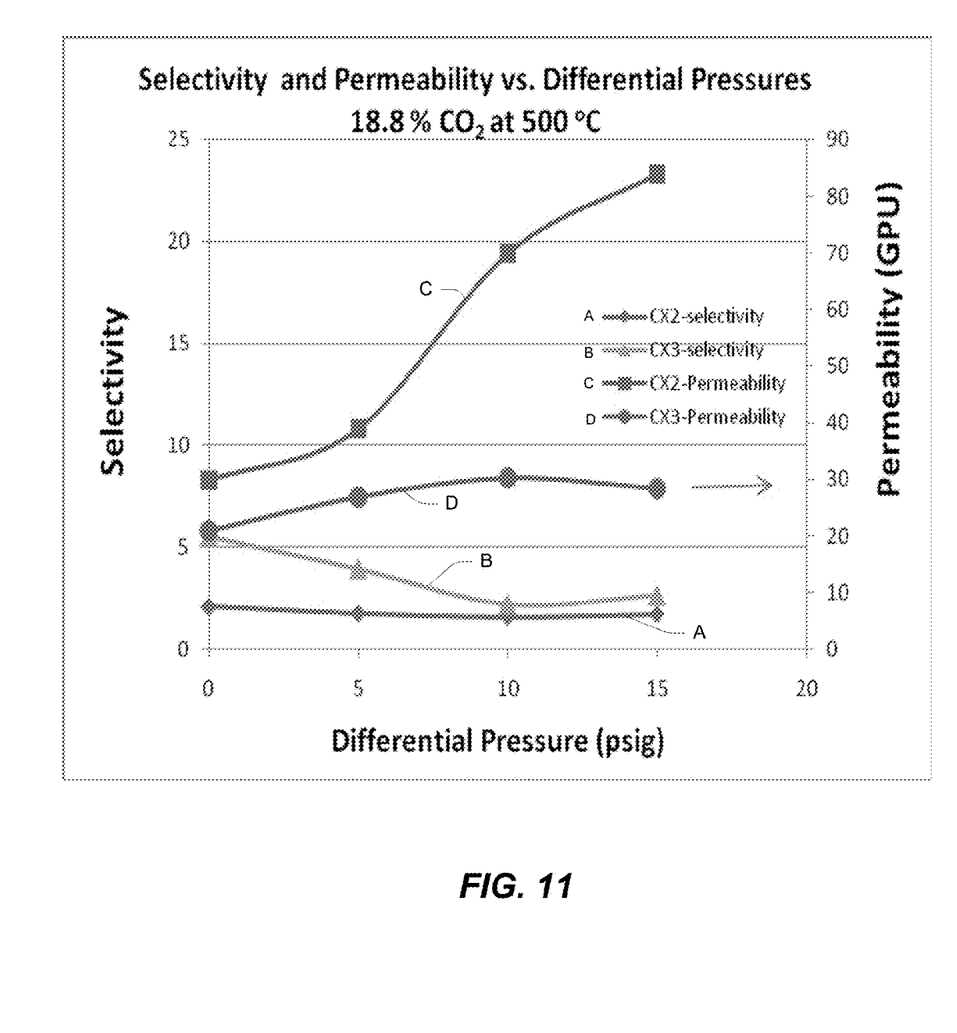
Figure 12:
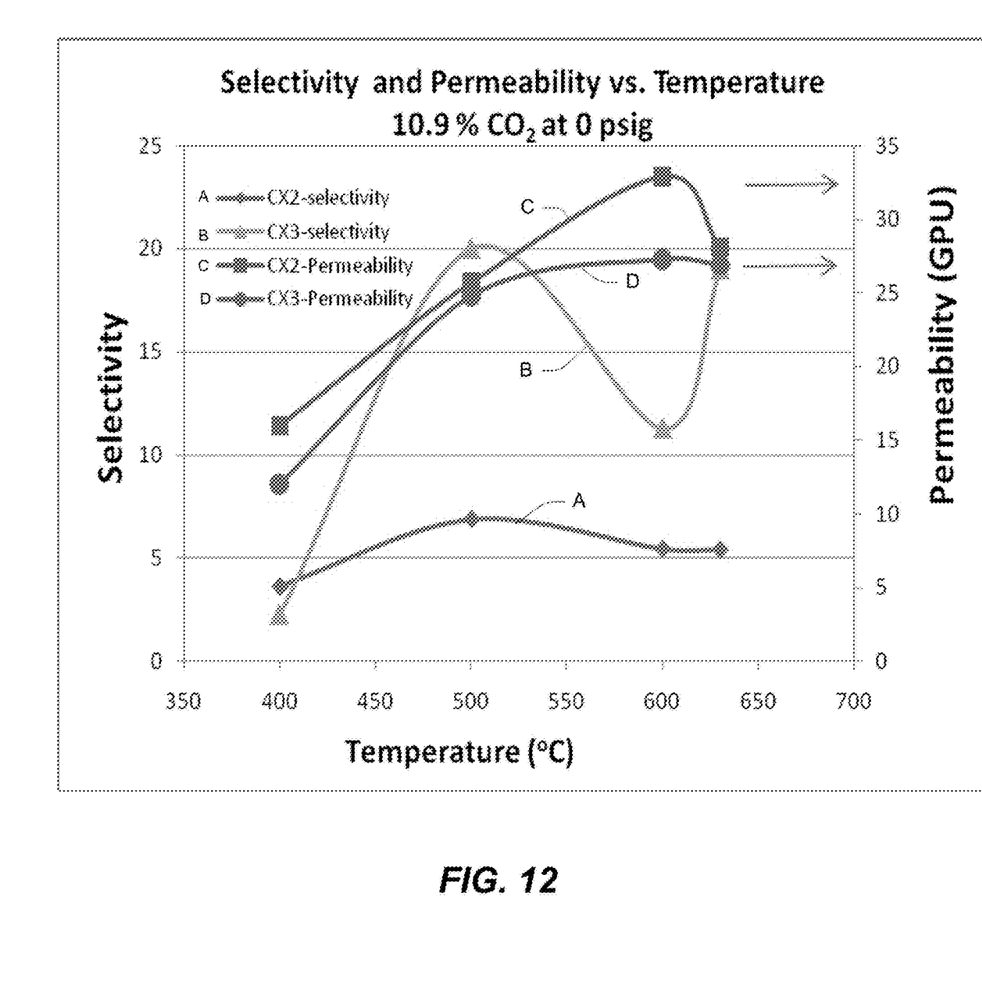
FIGS. 12-13 are plots of selectivity versus temperature for the indicated membranes.
Figure 13:
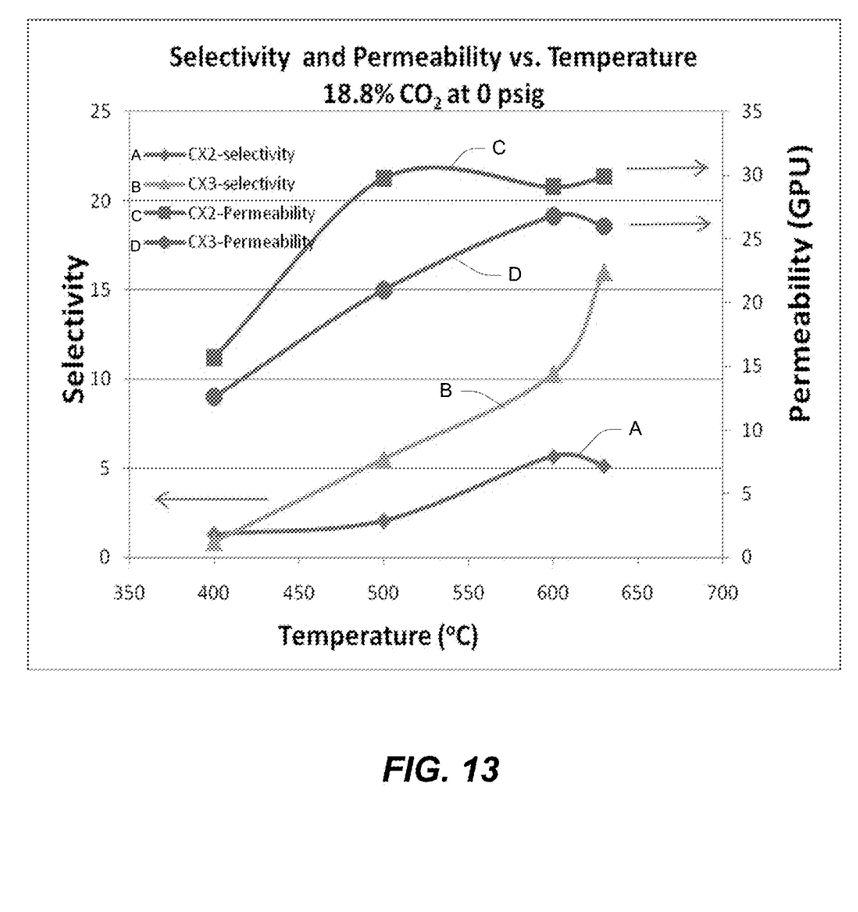

The performance of the membrane as a high temperature CO$_2$ separation membrane may be evaluated in a test system as shown in FIG. 9. Membranes may be evaluated at temperature of 400-630° C. under the conditions of anticipated flue gas in a coal-fired power plant; $CO_2$ of 10-20%, and differential pressure 0-5 psig. Selectivity of $CO_2/N_2$ and $CO_2$ permeability are the two parameters for measuring the effectiveness of a membrane as a $CO_2$ separator.

For the evaluation of the membranes, two parameters were measured: the $CO_2$ gas permeability and $CO_2/N_2$ selectivity. The quantity of $CO_2$ permeated through the membrane via various mechanisms is defined as the permeability or permeation:

$$\text{Permeability (permeation)} = (M_p \times F_1 \times (P/(R \times T))/(A \times P_1 \times 60)) \quad [\text{Eq. 3}]$$

in the units of $\text{mol}^{-2}\text{s}^{-1}$ mPa, or $$\text{Permeability (GPU)} = (((M_p \times F_1 \times (P/(R \times T)) \ast V)/(A \times P_1 \times 60))/(1\text{E}-6) \quad [\text{Eq. 4}]$$

in the units of $\text{cm}^3(\text{STP})\text{cm}^{-2}\text{s}^{-1}\text{cmHg}^{-1}$ as conventionally referred to as gas permeation unit (GPU)

where $M_p$ = Mole % of $CO_2$ in Sweep Side $F_1$ = Total flow rate of sweep gas, L/min P = Sample pressure in GC sampling Loop, 1 atm = 101325 Pa R = Gas constant, 8314.472 $P_a L\ K^{-1}\ \text{mol}^{-1}$ T = Temperature at Sample Loop, K A = Membrane Area, 0.0011 $\text{m}^2$ $P_1$ = Backpressure in Sweep Side, mPa The ability of a membrane to separate gases A and B is defined as Selectivity:

$$\text{Selectivity}(\alpha) = (Y_A/Y_B)/((P_h X_A - P_1 Y_A)/(P_h X_B - P_1 Y_B)) \quad [\text{Eq. 5}]$$

where $Y_A$ = Mole % $CO_2$ in Sweep Side $X_A$ = Mole % $CO_2$ in Feed Side $P_h$ = Backpressure in Feed Side $X_B$ = Mole % $N_2$ in Feed Side $Y_B$ = Mole % $N_2$ in Sweep Side $P_1$ = Backpressure in Sweep Side In the literature, a more conventional expression of the separation of two gases through the membrane is called the membrane separation factor ($S_{AB}$), which is a measure of the quality of separation that the membrane provides:

$$S_{AB} = (Y_A/Y_B)/(X_A/X_B) \quad [\text{Eq. 6}]$$

When the sweep side pressure approaches to zero, i.e, $P_1 \to 0$, the selectivity of the membrane for gases A and B is equal to the separation factor. In this disclosure, $S_{AB}$ is used as the selectivity and the GC responses (the peak areas) of $CO_2$ and $N_2$ in the gas streams for the computation of permeability.

Membrane Testing Results

Tables 1 to 4 presents typical selectivity and permeability data for the assembled membranes herein illustrated generally in FIGS. 1 and 2 and evaluated under different conditions expected in a coal-fired power plant: $CO_2$ at 10-20% by volume, and the differential pressure between the feed and sweep (permeate) sides in 0-15 psig. Comparisons of the data are depicted in FIGS. 10 to 13. The selectivity values of $CO_2/N_2$ obtained are temperature and differential pressure dependent. A relatively high selectivity, 2 to 20 at 500° C. is observed.

TABLE 1

Selectivity and Permeability of Membranes - Performance under Various Differential Pressure between the Feed and Permeate Sides
(Test Condition: $CO_2$ at 10.9% in $N_2$, 500° C.)

| Membrane | | Differential Pressure (psig) | | | |
|---|---|---|---|---|---|
| | | 0 | 5 | 10 | 15 |
| CX2 | Selectivity | 6.89 | 5.00 | 3.16 | 2.51 |
| | Permeability (GPU) | 25.7 | 37.7 | 53.3 | 65.6 |
| CX3 | Selectivity | 20.0 | 12.3 | 10.1 | 8.81 |
| | Permeability (GPU) | 24.8 | 38.9 | 46.4 | 56.9 |

Membranes:
CX2: 50% porosity substrate with dip coating for layer 18 (FIG. 1).
CX3: 50% porosity substrate with chemical spray coating for layer 18 (FIG. 1).

TABLE 2

Selectivity and Permeability of Membranes - Performance under Various Differential Pressure between the Feed and Permeate Sides
(Test Condition: $CO_2$ at 18.8% in $N_2$, 500° C.)

| Membrane | | Differential Pressure (psig) | | | |
|---|---|---|---|---|---|
| | | 0 | 5 | 10 | 15 |
| CX2 | Selectivity | 2.08 | 1.75 | 1.59 | 1.71 |
| | Permeability (GPU) | 29.8 | 38.9 | 69.9 | 83.9 |
| CX3 | Selectivity | 5.53 | 3.93 | 2.19 | 2.63 |
| | Permeability (GPU) | 21.0 | 26.9 | 30.2 | 28.4 |

Membranes
CX2: 50% porosity substrate with dip coating for layer 18 (FIG. 1)..
CX3: 50% porosity substrate with chemical spray coating for layer 18 (FIG. 1).

TABLE 3

Selectivity and Permeability of Membranes - Performance at Various Temperature
(Test Condition: $CO_2$ at 10.9% in $N_2$, Differential Pressure at 0 psig)

| Membrane | | Temperature (° C.) | | | |
|---|---|---|---|---|---|
| | | 400 | 500 | 600 | 630 |
| CX2 | Selectivity | 3.63 | 6.89 | 5.45 | 5.43 |
| | Permeability (GPU) | 16.0 | 25.7 | 32.9 | 28.1 |
| CX3 | Selectivity | 2.25 | 20.0 | 11.3 | 19.0 |
| | Permeability (GPU) | 12.0 | 24.8 | 27.3 | 26.9 |

Membranes
CX2: 50% porosity substrate with dip coating for layer 18 (FIG. 1)..
CX3: 50% porosity substrate with chemical spray coating for layer 18 (FIG. 1)..

TABLE 4

Selectivity and Permeability of Membranes - Performance at Various Temperature
(Test Condition: $CO_2$ at 18.8% in $N_2$, Differential Pressure at 0 psig)

| Membrane | | Temperature (° C.) | | | |
|---|---|---|---|---|---|
| | | 400 | 500 | 600 | 630 |
| CX2 | Selectivity | 1.33 | 2.08 | 5.67 | 5.17 |
| | Permeability (GPU) | 15.7 | 29.8 | 29.1 | 29.9 |
| CX3 | Selectivity | 0.89 | 5.5 | 10.3 | 16.0 |
| | Permeability (GPU) | 12.6 | 21.0 | 26.8 | 26.0 |

Membranes
CX2: 50% porosity substrate with dip coating for layer 18 (FIG. 1).
CX3: 50% porosity substrate with chemical spray coating for layer 18 (FIG. 1).

The foregoing description of several methods and embodiments has been presented for purposes of illustration. It is not intended to be exhaustive or to limit the claims to the precise steps and/or forms disclosed, and variations are possible in light of the above teaching. It is intended that the scope of the invention be defined by the claims appended hereto.

The invention claimed is:

1. A method of forming a membrane for separation of carbon dioxide ($CO_2$) from a mixture of gases comprising:
   supplying a substrate layer of inorganic oxides with average pore sizes of 3.0 μm to 10.0 μm which is 20-80% porous with a thickness of 6.0 mm to 15 mm;
   depositing on said substrate layer precursors for the formation of $Li_2ZrO_3$;
   reacting said precursors to form a $Li_2ZrO_3$ barrier layer wherein said barrier layer is formed at a thickness of 10 μm to 100 μm with a porosity of 0% to 30%;
   depositing on said barrier layer a sorbent layer comprising $Li_2ZrO_3$ at a thickness of 100 μm to 500 μm;
   depositing a cap layer on said sorbent layer comprising inorganic oxides wherein said cap layer has a thickness of 50 μm to 250 μm.

2. The method of claim 1 wherein said precursors deposited on said substrate comprise $LiNO_3$ and $ZrO(NO_3)_2$.

3. The method of claim 1 wherein said precursors deposited on said substrate are exposed to temperatures in the range of 700° C. to 900° C.

4. The method of claim 1 wherein, prior to said deposition of said precursors, said substrate is treated with a nanoparticle suspension containing $ZrO_2$ or organosilicate compounds.

5. The method of claim 1 wherein said substrate has a surface and an upper section comprising ⅓ of the thickness of said substrate wherein pores are present and wherein 50% or more of said pores in said upper section have a size of less than or equal to 5.0 μm.

6. The method of claim 1 wherein a eutectic mixture of $Li_2CO_3$:$K_2CO_3$ is applied to said substrate prior to deposition of said sorbent layer comprising said $Li_2ZrO_3$.

7. The method of claim 6 wherein said eutectic mixture is applied to provide a layer having a thickness of 0.1 μm to 10.0 μm.

8. The method of claim 1 wherein said cap layer has a porosity of 10%-90%.

9. The method of claim 1 wherein said cap layer comprises one of $Al_2O_3$, $ZrO_2$ or YSZ.

10. The method of claim 1 wherein said $Li_2ZrO_3$ is formed in-situ is potassium doped and has the formula of $K_xLi_{2-x}ZrO_3$ where x has a value of 0.2-1.0.

11. The method of claim 1 wherein said sorbent layer, upon exposure to carbon dioxide at temperatures of 400° C. to 700° C., results in the following reaction:

$$Li_2ZrO_{3(s)} + CO_{2(g)} \leftrightarrow Li_2CO_{3(l)} + ZrO_{2(s)}.$$

12. The method of claim 11, wherein said reaction provides said sorbent layer as a dual-phase sorbent layer comprising solid $ZrO_2$ and molten $Li_2CO_3$.

13. The method of claim 1 wherein said membrane has a feed side for introduction of mixed gases containing nitrogen ($N_2$) and a sweep side for recovery of $CO_2$ and said membrane has a selectivity α according to the following:

$$\alpha = (Y_A/Y_B)/((P_hX_A - P_1Y_A)/(P_hX_B - P_1Y_B))$$

where $Y_A$=mole % $CO_2$ in the sweep side, $X_A$=mole % $CO_2$ in the feed side, $P_h$=backpressure in the feed side, $X_B$=mole % $N_2$ in the feed side; $Y_B$=mole % $N_2$ in the sweep side, and $P_1$=backpressure in the sweep side;
   and wherein said value of α at 500° C. is in the range of 2.0 to 20.

14. A method of forming a membrane for separation of carbon dioxide ($CO_2$) from a mixture of gases comprising:
   supplying a substrate layer of inorganic oxides with average pore sizes of 3.0 μm to 10.0 μm which is 20-80% porous with a thickness of 6.0 mm to 15 mm;
   depositing on said substrate layer precursors for the formation of $Li_2ZrO_3$ comprising $LiNO_3$ and $ZrO(NO_3)_2$;
   reacting said precursors to form a $Li_2ZrO_3$ barrier layer at temperatures of 700° C. to 900° C. wherein said barrier layer is formed at a thickness of 10 μm to 100 μm with a porosity of 0% to 30%;
   depositing on said barrier layer a sorbent layer comprising $Li_2ZrO_3$ at a thickness of 100 μm to 500 μm;
   depositing a cap layer on said sorbent layer comprising inorganic oxides wherein said cap layer has a thickness of 50 μm to 250 μm;
   exposing said membrane to a mixture of gases containing carbon dioxide at temperatures of 400° C. to 700° C. and separating carbon dioxide from said mixture of gases.

15. A membrane for separation of carbon dioxide ($CO_2$) from a mixture of gases comprising:
   a substrate layer comprising inorganic oxides with average pore sizes of 3.0 μm to 10.0 μm which is 20-80% porous with a thickness of 6.0 mm to 15 mm;
   a barrier layer of in-situ $Li_2ZrO_3$ at a thickness of 10 μm to 100 μm with a porosity of 0% to 30%;
   a $Li_2ZrO_3$ sorbent layer at a thickness of 100 μm to 500 μm;
   an inorganic oxide cap layer at a thickness of 50 μm to 250 μm; and wherein said membrane defines a feed side for introduction of mixed gases containing nitrogen ($N_2$) and a sweep side for recovery of $CO_2$ and said membrane has a selectivity α according to the following:

$$\alpha = (Y_A/Y_B)/((P_hX_A - P_1Y_A)/(P_hX_B - P_1Y_B))$$

where $Y_A$=mole % $CO_2$ in the sweep side, $X_A$=mole % $CO_2$ in the feed side, $P_h$=backpressure in the feed side, $X_B$=mole % $N_2$ in the feed side; $Y_B$=mole % $N_2$ in the sweep side, and $P_1$=backpressure in the sweep side;
   and wherein said value of α at 500° C. is in the range of 2.0 to 20.

16. The membrane of claim 15 wherein said barrier layer contains $LiNO_3$ and $ZrO(NO_3)_2$ precursors which provide said $Li_2ZrO_3$.

17. The membrane of claim 15 wherein said $Li_2ZrO_3$ is potassium doped and has the formula of $K_xLi_{2-x}ZrO_3$ where x has a value of 0.2-1.0.

* * * * *